United States Patent
Perry et al.

(10) Patent No.: US 12,499,604 B2
(45) Date of Patent: Dec. 16, 2025

(54) UPDATING SHADER SCHEDULING POLICY AT RUNTIME

(71) Applicants: Advanced Micro Devices, Inc., Santa Clara, CA (US); ATI Technologies ULC, Markham (CA)

(72) Inventors: Thomas Daniel Perry, Bellevue, WA (US); Steven John Tovey, Milton Keynes (GB); Mehdi Saeedi, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 383 days.

(21) Appl. No.: 17/562,884

(22) Filed: Dec. 27, 2021

(65) Prior Publication Data

US 2023/0206537 A1 Jun. 29, 2023

(51) Int. Cl.
*G06T 15/00* (2011.01)
*A63F 13/52* (2014.01)

(52) U.S. Cl.
CPC ............ *G06T 15/005* (2013.01); *A63F 13/52* (2014.09)

(58) Field of Classification Search
CPC ... G06T 15/005; G06F 9/3851; G06F 9/3888; G06F 9/4881; A63F 13/52; A63F 13/77
See application file for complete search history.

(56) References Cited

U.S. PATENT DOCUMENTS

| | | | |
|---|---|---|---|
| 6,108,460 A | 8/2000 | Rich | |
| 6,243,081 B1 | 6/2001 | Goris et al. | |
| 6,452,602 B1 | 9/2002 | Morein | |
| 6,959,110 B1 | 10/2005 | Danskin et al. | |
| 7,042,462 B2 | 5/2006 | Kim et al. | |
| 7,239,322 B2 | 7/2007 | Lefebvre et al. | |
| 7,719,540 B2 | 5/2010 | Piazza et al. | |
| 8,174,534 B2 | 5/2012 | Jiao | |

(Continued)

OTHER PUBLICATIONS

European Search Report in European Application No. 17150171.1, mailed Jul. 26, 2017, 4 pages.

(Continued)

*Primary Examiner* — Kevin Y Kim
(74) *Attorney, Agent, or Firm* — Kowert, Hood, Munyon, Rankin & Goetzel, P.C.; Rory D. Rankin

(57) ABSTRACT

Systems, apparatuses, and methods for updating and optimizing task scheduling policies are disclosed. A new policy is obtained and updated at runtime by a client based on a server analyzing a wide spectrum of telemetry data on a relatively long time scale. Instead of only looking at the telemetry data from the client's execution of tasks for the previous frame, the server analyzes the execution times of tasks for multiple previous frames so as to determine a more optimal policy for subsequent frames. This mechanism enables making a more informed task scheduling policy decision as well as customizing the policy per application, game, and user without requiring a driver update. Also, this mechanism facilitates improved load balancing across the various processing engines, each of which has their own task queues. The improved load balancing is achieved by analyzing the telemetry data including resource utilization statistics for the different processing engines.

19 Claims, 9 Drawing Sheets

(56) References Cited

U.S. PATENT DOCUMENTS

| | | | |
|---|---|---|---|
| 8,295,621 | B1 | 10/2012 | Diard |
| 8,643,659 | B1 | 2/2014 | Baldwin |
| 9,819,970 | B2 | 11/2017 | Sermadevi et al. |
| 10,606,740 | B2 | 3/2020 | Zhu et al. |
| 2007/0011432 | A1 | 1/2007 | Tuuk et al. |
| 2007/0198939 | A1* | 8/2007 | Gold ............... H04L 67/125 715/757 |
| 2009/0189909 | A1 | 7/2009 | Jiao et al. |
| 2012/0320067 | A1 | 12/2012 | Iourcha et al. |
| 2015/0026438 | A1 | 1/2015 | Giroux et al. |
| 2015/0070380 | A1 | 3/2015 | Lum et al. |
| 2015/0070381 | A1 | 3/2015 | Lum et al. |
| 2016/0300320 | A1 | 10/2016 | Iourcha et al. |
| 2017/0186224 | A1 | 6/2017 | Diard |
| 2017/0256024 | A1 | 9/2017 | Abraham et al. |
| 2017/0256025 | A1 | 9/2017 | Abraham et al. |
| 2017/0278215 | A1 | 9/2017 | Appu et al. |
| 2017/0287209 | A1 | 10/2017 | Gierach et al. |
| 2018/0089091 | A1 | 3/2018 | Akenine-Moller et al. |
| 2018/0165786 | A1* | 6/2018 | Bourd ............... G06T 1/20 |
| 2018/0182155 | A1 | 6/2018 | Mirza et al. |
| 2019/0232164 | A1* | 8/2019 | Griffais ............ A63F 13/79 |

OTHER PUBLICATIONS

Communication pursuant to Article 94(3) EPC in European Application No. 17150171.1, mailed Jan. 15, 2018, 4 pages.

Non-Final Office Action in U.S. Appl. No. 15/389,075, mailed Apr. 11, 2019, 16 pages.

Akenine-Möller, et al., "Graphics Processing Units for Handhelds", Proceedings of the IEEE, May 2008, pp. 779-789, vol. 96, Issue 5, IEEE, New York, NY, USA.

International Search Report and Written Opinion in International Application No. PCT/US2012/042442, mailed Oct. 31, 2012, 11 pages.

Woo et al., "A 195mW, 9.1 MVertices/s Fully Programmable 3-D Graphics Processor for Low-Power Mobile Devices", IEEE Journal of Solid-State Circuits, Nov. 19, 2008, pp. 2370-2380, vol. 43, No. 11, IEEE, Piscataway, NJ, USA.

Communication pursuant to Article 94(3) EPC in European Application No. 17150171.1, mailed Jul. 25, 2018, 3 pages.

International Search Report and Written Opinion in International Application No. PCT/US2017/067697, mailed Mar. 20, 2018, 10 pages.

Non-Final Office Action in U.S. Appl. No. 15/389,075, mailed Apr. 23, 2018, 13 pages.

Final Office Action in U.S. Appl. No. 15/389,075, mailed Sep. 19, 2018, 14 pages.

* cited by examiner

| User ID 510 | Video Game ID 520 | Section of Video Game 530 | Telemetry Data 540 | Shader Scheduling Policy 540 |
|---|---|---|---|---|
| 000 | 000 | First Section | 0x00AA20 | 0x0043D0 |
| ... | ... | ... | ... | ... |
| 111 | 111 | Fifth Section | 0x00E680 | 0x00C2A0 |

500

FIG. 5

UPDATING SHADER SCHEDULING POLICY AT RUNTIME

BACKGROUND

Description of the Related Art

Graphics rendering tasks are increasing in complexity as the scene content being rendered expands in scope. Scheduling the graphics rendering tasks presents many challenges to programmers and designers of graphics processing architecture. Some tasks may be executed in parallel, while other tasks are required to be performed in serial fashion. Scheduling algorithms are typically generalized and optimized for the general case and general usage. This can cause various delays and result in idle time for the graphics processing hardware.

BRIEF DESCRIPTION OF THE DRAWINGS

The advantages of the methods and mechanisms described herein may be better understood by referring to the following description in conjunction with the accompanying drawings, in which:

FIG. 5 illustrates one implementation of a user-video game application shader scheduling policy mapping table.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for updating shader scheduling policy at runtime are disclosed herein. In one implementation, a new shader scheduling policy is obtained and updated at runtime by a client based on a server analyzing a wide spectrum of telemetry data on a relatively long time scale. Instead of only looking at the telemetry data from the client's execution of shader tasks for the previous frame, the server analyzes the execution times of shader tasks for multiple previous frames so as to determine a more optimal policy for subsequent frames. This mechanism enables making a more informed shader task scheduling policy decision as well as customizing the policy per application, game, and user. In one implementation, these advantages are achieved without requiring a driver update. Also, this mechanism facilitates improved load balancing across the various processing engines, each of which has their own queues. The improved load balancing is based on analyzing the telemetry data including resource utilization statistics for the different processing engines.

Figure 1:
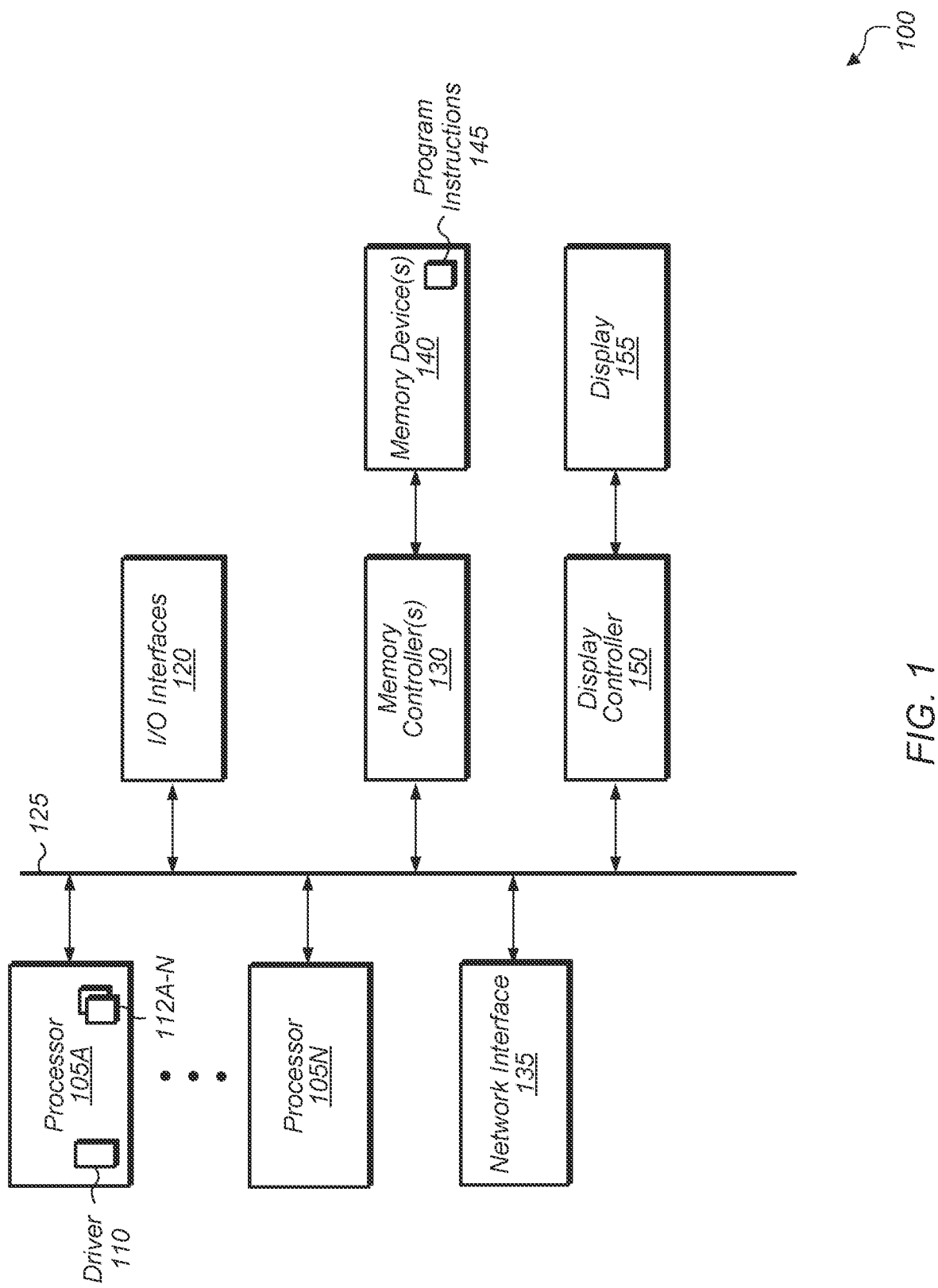
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU), with any number of execution units 112A-N (i.e., processor cores) for executing program instructions. In one implementation, processor 105N is a data parallel processor with a highly parallel architecture, such as a graphics processing unit (GPU) which renders pixels for display controller 150 to drive to display 155. In one implementation, processor 105A executes a driver 110 (e.g., graphics driver) for communicating with and/or controlling the operation of one or more of the other processors in system 100. In one implementation, driver 110 includes a shader scheduling policy which is updated in real-time by a new policy generated by a cloud server. This update to the shader scheduling policy can occur for an active driver component.

In one implementation, the shader scheduling policy determines the order in which shaders are scheduled for each frame being rendered by processor 105N. The execution of shader jobs has a considerable amount of flexibility in terms of scheduling. There are several hard data dependencies that should be preserved, but beyond that there is a combinatorial expansion of potential solutions on how to schedule a sequence of shader jobs for a single game frame. In more general cases, driver 110 can include a task scheduling policy which determines the sequence of tasks that are executed for a given software application. More details on generating optimized shader scheduling policies and optimized task scheduling policies will be provided throughout the remainder of this disclosure.

In one implementation, processor 105N is a GPU. A GPU is a complex integrated circuit that performs graphics-processing tasks. For example, a GPU executes graphics-processing tasks required by an end-user application, such as a video-game application. GPUs are also increasingly being used to perform other tasks which are unrelated to graphics. The GPU can be a discrete device or can be included in the same device as another processor, such as a CPU. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for an application, a second set of program instructions for a driver component, and so on. Alternatively, program instructions 145 can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
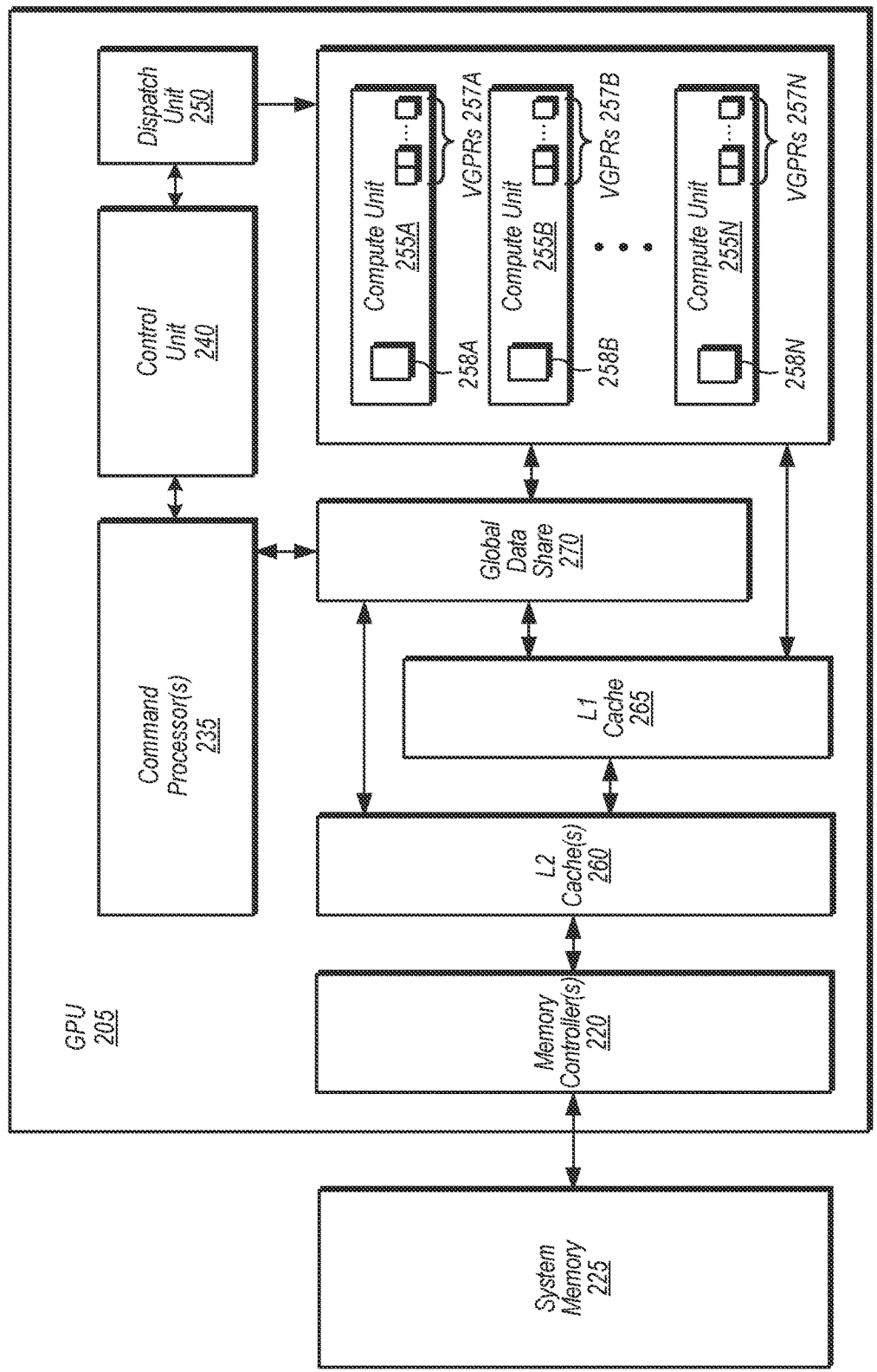
FIG. 2 is a block diagram of another implementation of a computing system.

Turning now to FIG. 2, a block diagram of another implementation of a computing system 200 is shown. In one implementation, system 200 includes at least GPU 205 and system memory 225. System 200 can also include other components which are not shown to avoid obscuring the figure. GPU 205 includes at least command processor(s) 235, control unit 240, dispatch unit 250, compute units 255A-N, memory controller(s) 220, global data share 270, level one (L1) cache 265, and level two (L2) cache(s) 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches work to be performed on GPU 205. In one implementation, command processor 235 receives kernels from the host CPU, and command processor 235 uses dispatch unit 250 to issue corresponding wavefronts to compute units 255A-N. It is noted that dispatch unit 250 can also be referred to herein as scheduler 250 or scheduling unit 250. In one implementation, a wavefront launched on a given compute unit 255A-N includes a plurality of work-items executing on the single-instruction, multiple-data (SIMD) units of the given compute unit 255A-N. Wavefronts executing on compute units 255A-N can access vector general purpose registers (VGPRs) 257A-N and a corresponding local data share (LDS) 258A-N located on compute units 255A-N. It is noted that VGPRs 257A-N are representative of any number of VGPRs.

Figure 3:
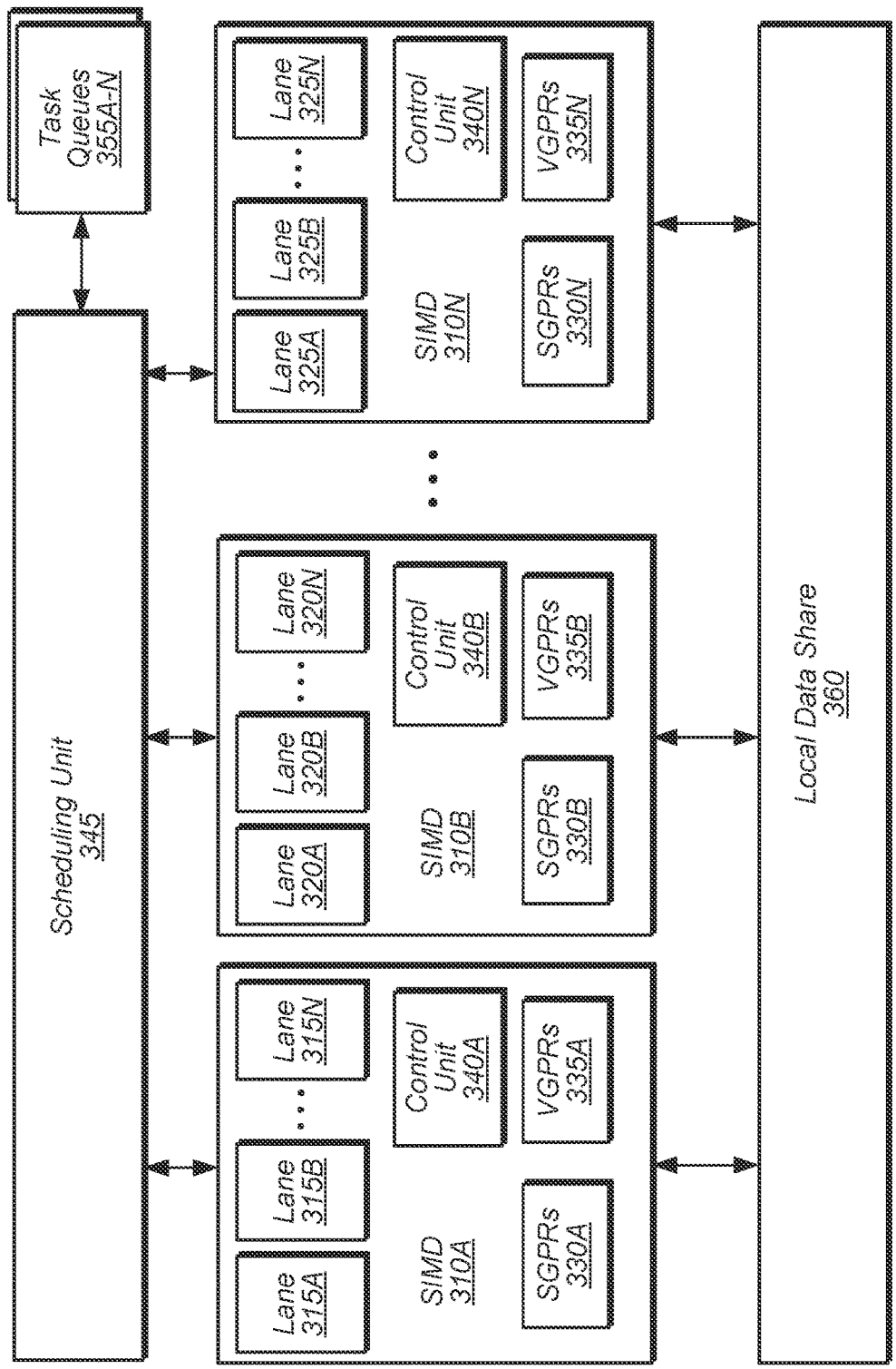
FIG. 3 is a block diagram of one implementation of a compute unit.

Referring now to FIG. 3, a block diagram of one implementation of a compute unit 300 is shown. In one implementation, compute unit 300 includes at least SIMDs 310A-N, scheduling unit 345, task queues 355A-N, and local data share (LDS) 360. It is noted that compute unit 300 can also include other components (e.g., texture load/store units, cache, texture filter units, branch and message unit, scalar unit, instruction buffer) which are not shown in FIG. 3 to avoid obscuring the figure. In one implementation, each of compute units 255A-N (of FIG. 2) includes the circuitry of compute unit 300.

Scheduling unit 345 schedules shader tasks according to a programmable shader scheduling policy. A shader scheduling policy includes the rules or parameterization of the scheduling algorithm of the various shader tasks for the given application being executed by the overall processing unit (e.g., GPU). When a data-parallel kernel is dispatched to compute unit 300, corresponding tasks are enqueued in task queues 355A-N. Work-items (i.e., threads) of the kernel executing the same instructions are grouped into a fixed sized batch called a wavefront to execute on compute unit 300. Multiple wavefronts can execute concurrently on compute unit 300. The instructions of the threads of the wavefronts are stored in an instruction buffer (not shown) and scheduled for execution on SIMDs 310A-N by scheduling unit 345. When the wavefronts are scheduled for execution on SIMDs 310A-N, corresponding threads execute on the individual lanes 315A-N, 320A-N, and 325A-N in SIMDs 310A-N. Each lane 315A-N, 320A-N, and 325A-N of SIMDs 310A-N can also be referred to as an "execution unit" or an "execution lane".

In one implementation, compute unit 300 receives a plurality of instructions for a wavefront with a number N of threads, where N is a positive integer which varies from processor to processor. When threads execute on SIMDs 310A-N, the instructions executed by threads can include store and load operations to/from scalar general purpose registers (SGPRs) 330A-N, VGPRs 335A-N, and LDS 360. Control units 340A-N in SIMDs 310A-N are representative of any number of control units which can be located in any suitable location(s) within compute unit 300. Control units 340A-N can be implemented using any suitable combination of circuitry and/or program instructions.

Figure 4:
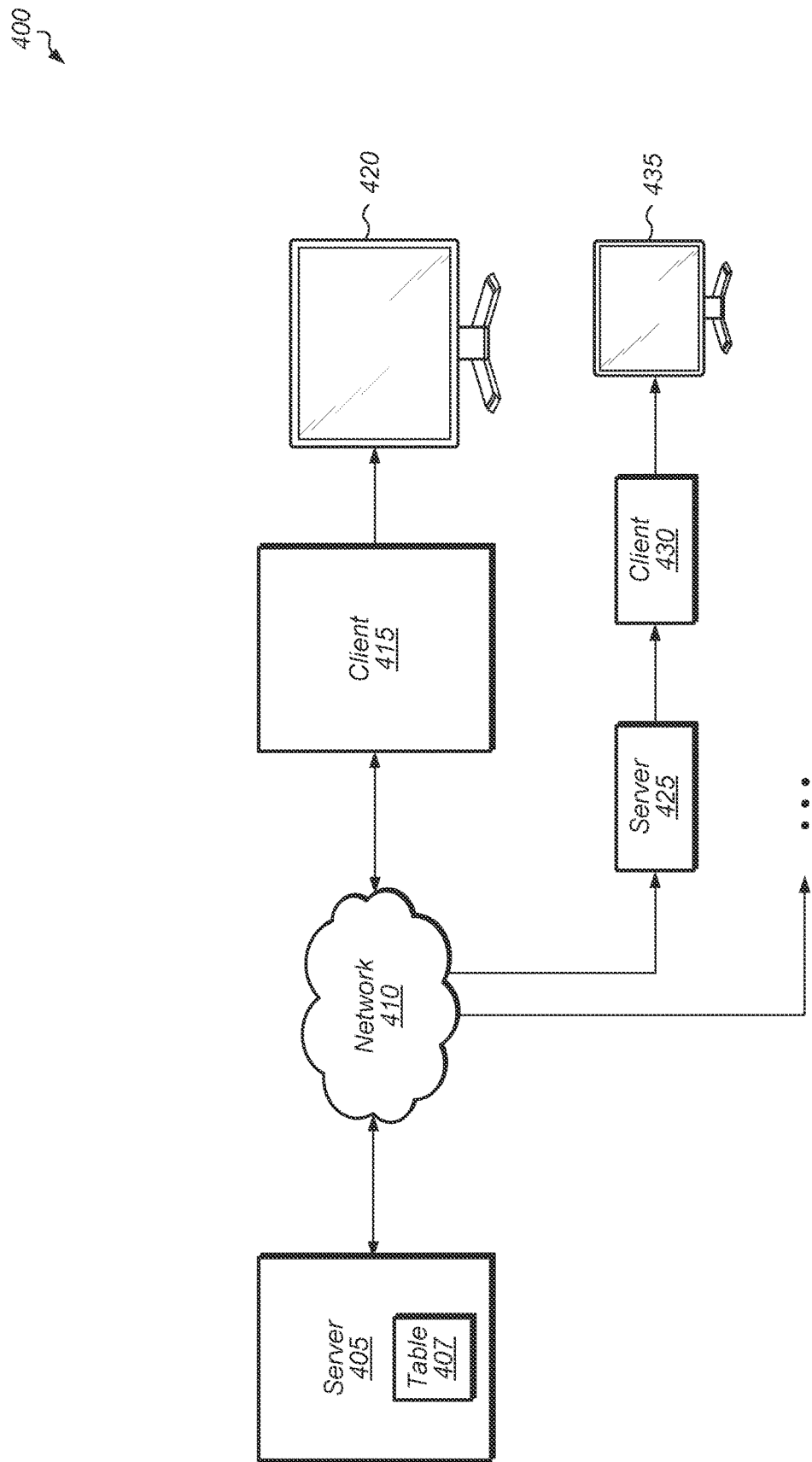
FIG. 4 is a block diagram of one implementation of a system for generating optimized shader scheduling policies.

Turning now to FIG. 4, a block diagram of one implementation of a system 400 for generating optimized shader scheduling policies is shown. System 400 includes server 405, network 410, client 415, and display 420. In other implementations, system 400 can include multiple clients connected to server 405 via network 410 and/or other networks, with the multiple clients receiving corresponding shader scheduling policies generated by server 405. System 400 can also include more than one server 405 for generating shader scheduling policies for multiple clients. In one implementation, system 400 generates optimal shader scheduling policies so as to implement real-time rendering of video game content as part of a cloud gaming application. The optimal shader scheduling policies can cause improvements to various parameters such as latency, quality, power consumption, performance, and so on. In other implementations, system 400 generates task scheduling policies for other types of applications.

In one implementation, client 415 generates telemetry data while executing an application with a first shader scheduling policy. In this implementation, client 415 forwards the telemetry data to server 405 via network 410. Server 405 analyzes the telemetry data and generates a second shader scheduling policy based on the analysis. Server 405 forwards the second shader scheduling policy to client 415 to be used by client 415 for subsequent frames of the video game application. In one implementation, server 405 includes table 407 which maps user and video game combinations to various telemetry data and shader scheduling policies. In this implementation, server 405 generates a shader scheduling policy that is specific to the particular user and the video game being played by the user. One example of an implementation of table 407 is described in further detail below in the discussion associated with FIG. 5.

In one implementation, client 415 generates video frames or images to drive to display 420 or to a display compositor. In one implementation, client 415 includes a game engine for rendering images to be displayed to a user. As used herein, the term "game engine" is defined as a real-time rendering application for rendering images. A game engine can include various shaders (e.g., vertex shader, geometry shader) for rendering images. The game engine is typically utilized to generate rendered images to be immediately displayed on display 420.

In one implementation, system 400 also includes server 425 coupled to client 430 driving frames to display 435. It is noted that display 435 can be integrated within client 430 even though display 435 is shown as being separate from client 430. In this implementation, server 425 is rendering video frames or running a game engine and sending the game frames to client 430 for playback. In one implementation, server 425 receives, from server 405, scheduling updates to the shader scheduling policy used for rendering the video frames. In other implementations, the updates to the scheduling policy can apply to any type of GPU-accelerated application such as machine learning training (e.g., pytorch, tensorflow), image editing (e.g., Photoshop), video editing (e.g., After Effects, Premier), three-dimensional (3D) rendering (e.g., Blender, Maya), or other application. It is noted that system 400 can also include any number of other servers, clients, and server-client combinations.

Network 410 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 410 can further include remote direct memory access (RDMA) hardware and/or software, transmission control protocol/internet protocol (TCP/IP) hardware and/or software, router, repeaters, switches, grids, and/or other components.

Server 405 includes any combination of software and/or hardware for generating shader scheduling policies, task scheduling policies, and the like. In one implementation, server 405 includes one or more software applications executing on one or more processors of one or more servers. Server 405 also includes network communication capabilities, one or more input/output devices, and/or other components. The processor(s) of server 405 can include any number and type (e.g., graphics processing units (GPUs), CPUs, DSPs, FPGAs, ASICs) of processors. The processor(s) can be coupled to one or more memory devices storing program instructions executable by the processor(s). Similarly, client 415 includes any combination of software and/or hardware for executing applications and driving pixel data to display 420. In one implementation, client 415 includes one or more software applications executing on one or more processors of one or more computing devices. Client 415 can be a computing device, game console, mobile device, streaming media player, or other type of device. Depending on the implementation, client 415 can include any of the components shown in FIG. 1-3 organized according to the structures of FIG. 1-3 or according to other suitable structures.

Referring now to FIG. 5, an example of a user-video game application shader scheduling policy mapping table 500 in accordance with one implementation is shown. In one implementation, user-video game application shader scheduling policy mapping table 500 includes user ID field 510, video game ID field 520, video game section field 530, telemetry data field 540, and shader scheduling policy field 550. In one implementation, each unique user ID-video game ID combination has a separate entry in table 500. This allows the server to generate, maintain, and organize shader scheduling policies which are customized for each different video game played by each different user. If a given user plays multiple different video games, then there will be a separate entry in table 500 for each different video game played by the user. Also, in one implementation, each video game can be partitioned into different sections or parts of the game, with each section having a different shader scheduling policy that is optimized for the game conditions during that section. In one implementation, these sections are identified by field 530.

When the server receives telemetry data for a given user-video game combination, the server stores the telemetry data in a given memory location and then inserts a pointer or reference to the given memory location in the corresponding entry of table 500. Similarly, when the server generates a shader scheduling policy based on an analysis of the telemetry data, the server stores a pointer or reference to the location of the shader scheduling policy in memory. It should be understood that user-video game application shader scheduling policy mapping table 500 represents one example of a mapping table for use by a server when generating shader scheduling policies. In other implementations, other types of mapping tables, with other fields and/or structured in other ways than is shown in FIG. 5, can be employed by a server for customizing scheduling policies for a plurality of clients.

Figure 6:
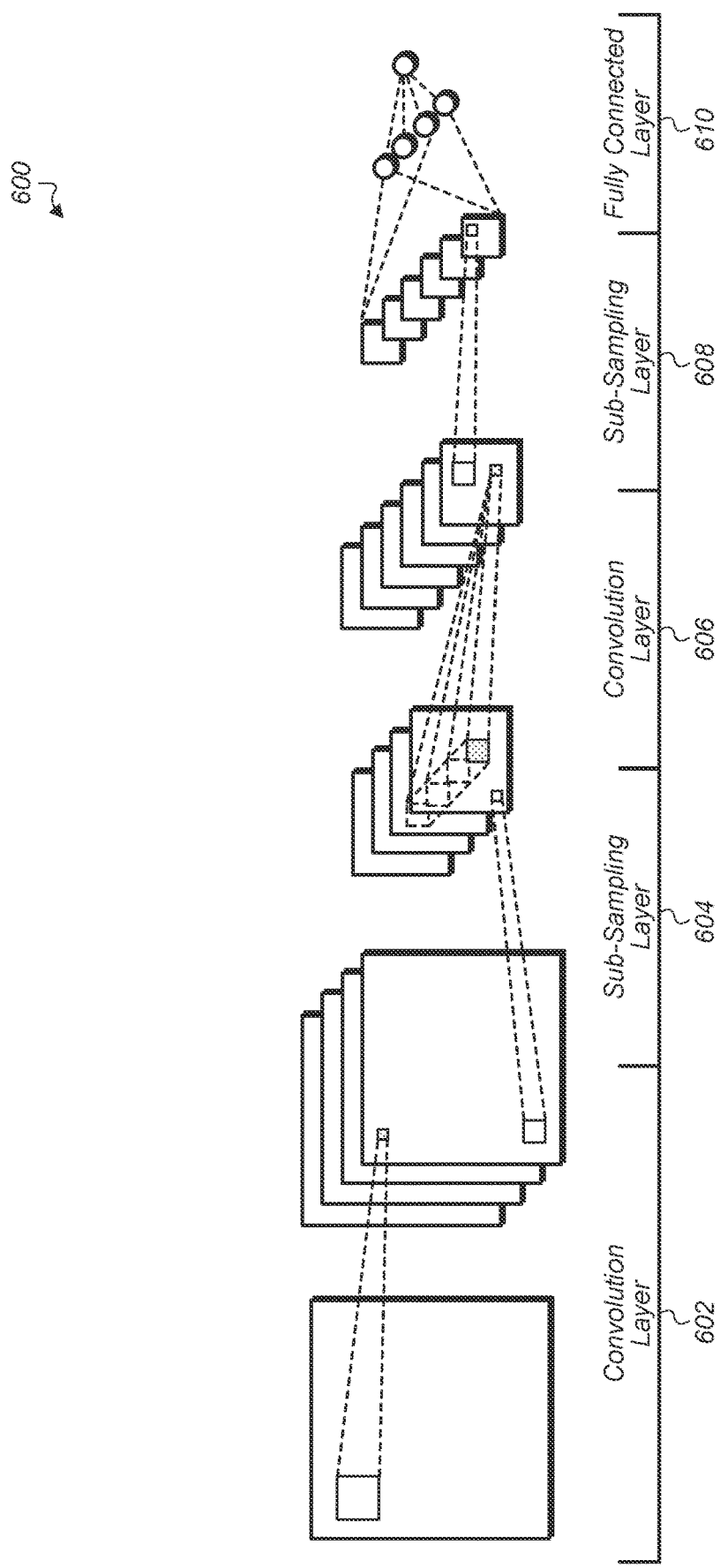
FIG. 6 is a block diagram of one implementation of a neural network.

Turning now to FIG. 6, a block diagram of one implementation of a neural network 600 is shown. Neural network 600 includes convolution layer 602, sub-sampling layer 604, convolution layer 606, sub-sampling layer 608, and fully connected layer 610. In other embodiments, neural network 600 can include other numbers and arrangements of layers. Neural network 600 is one example of a machine learning (ML) model that can be used by a server (e.g., server 400 of FIG. 4) to generate optimized shader scheduling policies for various clients. In other implementations, other types of ML models can be used by the server to generate optimized shader scheduling policies. In one implementation, the policy file generated by the server includes the weights for the ML model that has been trained using supervised learning, reinforcement learning, or imitation learning to produce optimal scheduling behavior.

When implementing neural network 600 on a computing system (e.g., system 100 of FIG. 1, system 200 of FIG. 2), the performance of the system can vary widely depending on the particular program parameters that are chosen for each layer. Accordingly, in one implementation, the system executes multiple programs (i.e., tuning runs) to determine the preferred operating parameters to use for each layer of neural network 600 so as to optimize performance. Then, during subsequent iterations of the neural network 600, the system uses the preferred parameters to optimize the performance of each layer.

In one implementation, a client uploads telemetry data to a server deploying neural network 600. The client can also upload to the server identifications of the user and game being played or application being executed. In some cases, an initial set of neural network weights are uploaded from the client to the server. For example, a previous tuning session of neural network 600 may have resulted in a first set of refined neural network weights, with the first set of refined neural network weights being stored by the client in one implementation. The first set can be a starting point for a new video game session being played by a given user. The telemetry data is then used to refine the first set of weights to generate a second set of weights for neural network 600. The neural network 600 then generates a new policy which is used for scheduling shader tasks for the new video game session of the given user.

If the user switches to a new game, then the server is notified, and a new training session is initiated for the new game. The neural network 600 can store multiple different weights for different games. Also, the server can store multiple different sets of weights for the different games being played by an individual user. In one implementation, IDs of the user and the game can be inputs to a library of different sets of weights. In this implementation, the server loads the correct set of weights based on the user and game being played. Alternatively, the client can store the different sets of weights for different user-game combinations. Then these weights can be uploaded to the server as a starting point for a new session.

Figure 7:
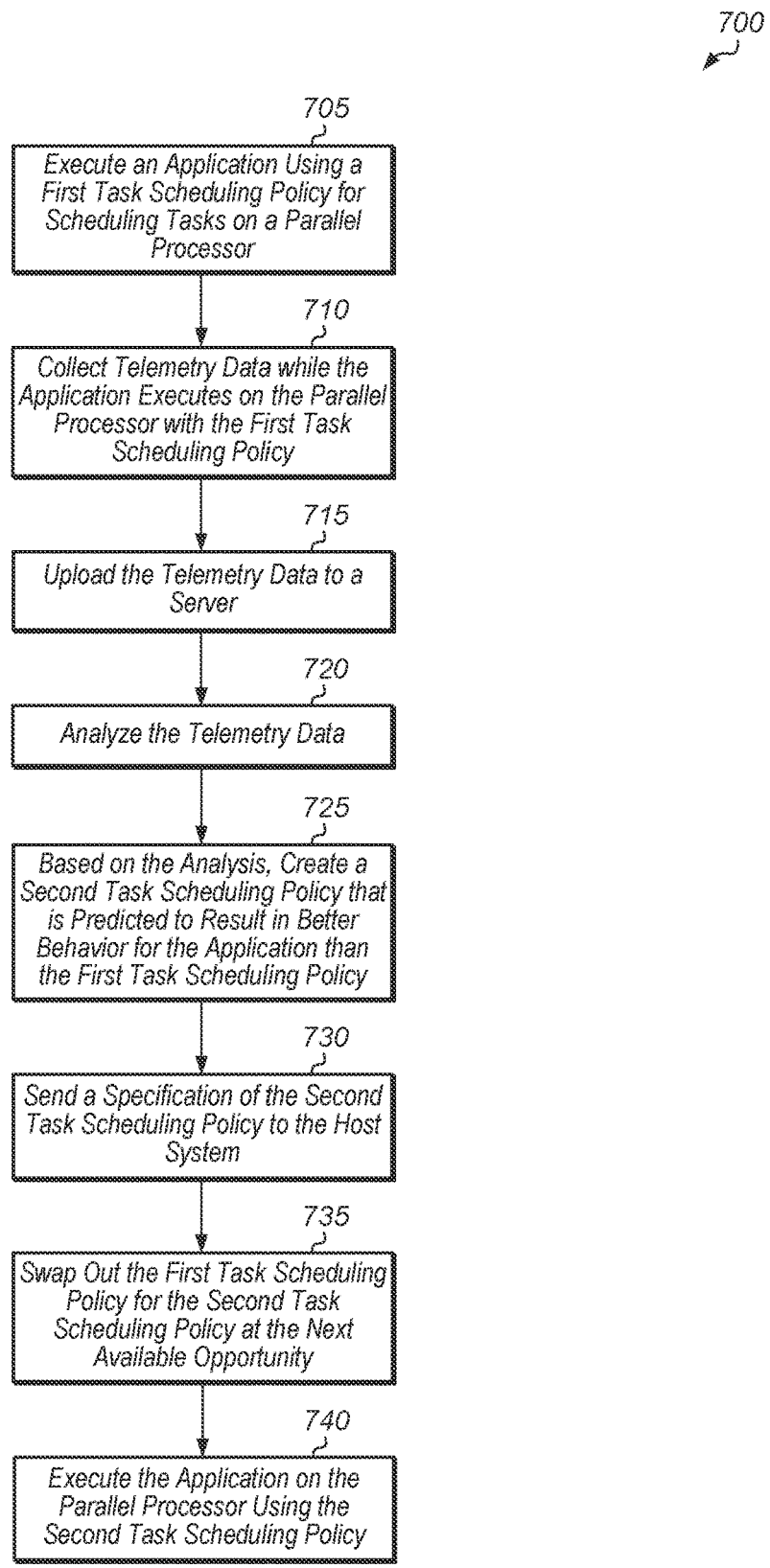
FIG. 7 is a generalized flow diagram illustrating one implementation of a method for updating to a more optimal task scheduling policy.
Figure 8:
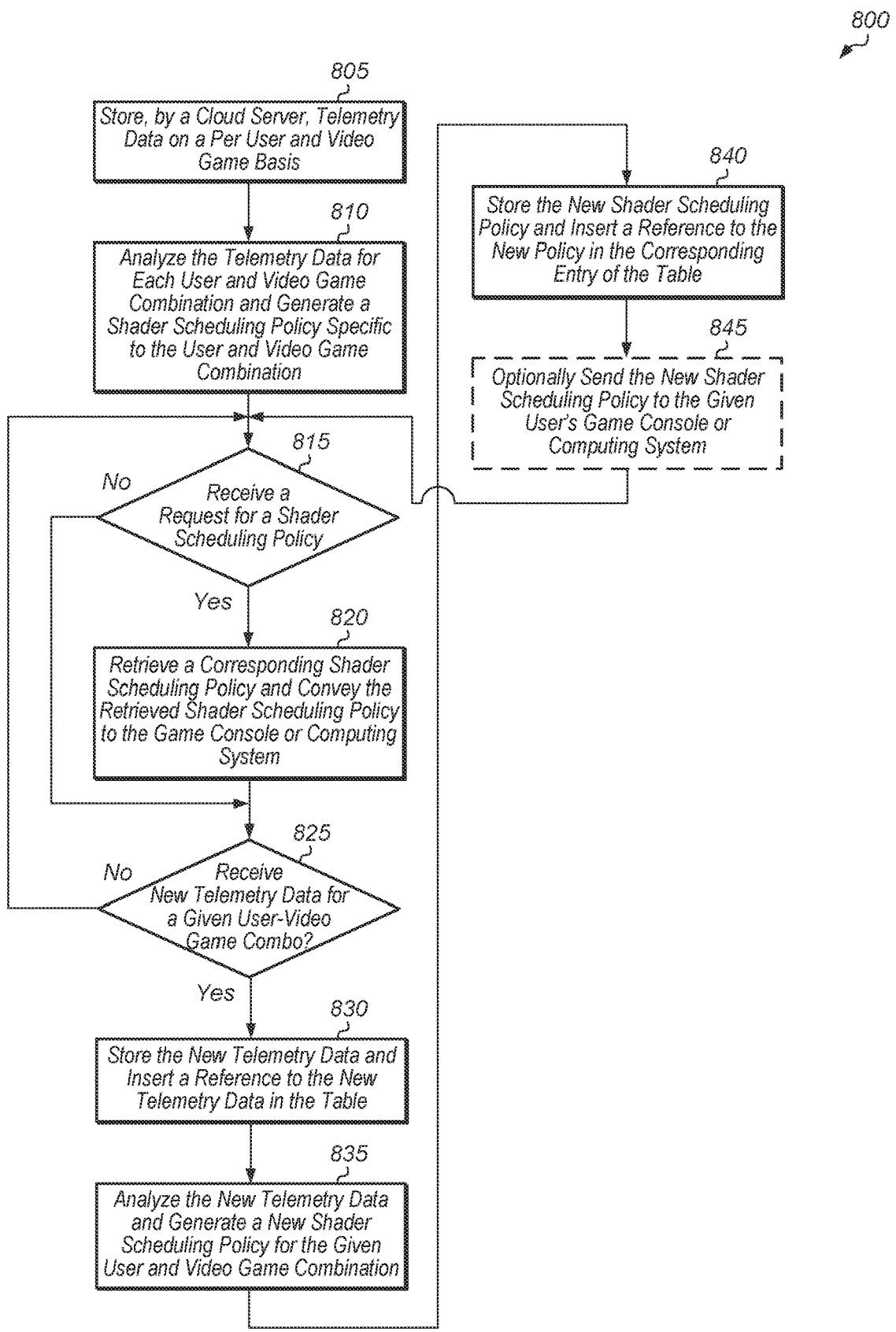
FIG. 8 is a generalized flow diagram illustrating one implementation of a method for a cloud server generating shader scheduling policies optimized for user-video game combinations.
Figure 9:
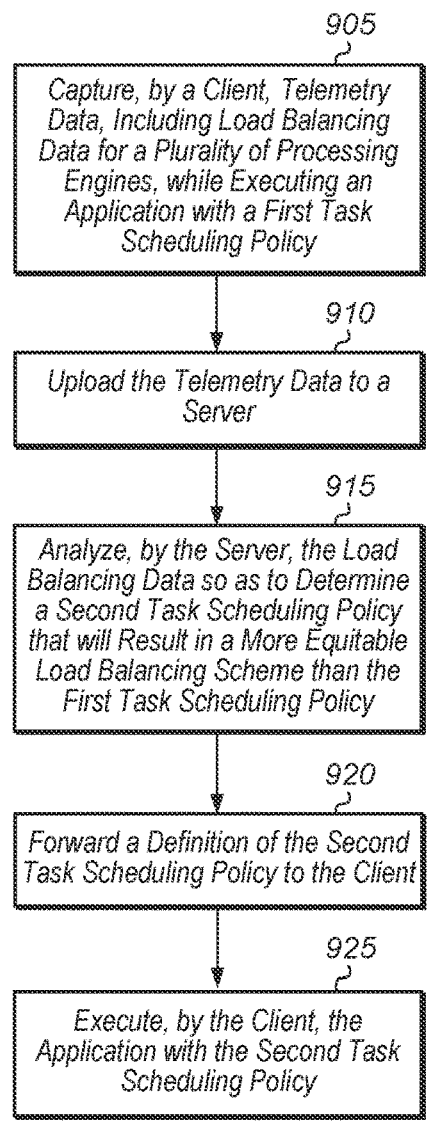
FIG. 9 is a generalized flow diagram illustrating one implementation of a method for generating scheduling policies to optimize load balancing.

Referring now to FIG. 7, one implementation of a method 700 for updating to a more optimal task scheduling policy is shown. For purposes of discussion, the steps in this implementation and those of FIG. 8-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700 (and methods 800-900).

An application executes on a parallel processor (e.g., GPU 205 of FIG. 2) using a first task scheduling policy for scheduling tasks on the parallel processor (block 705). In one implementation, the application is a video game application. In another implementation, the application is a tensor graph convolutional neural network. In other implementations, other types of applications are executed on the parallel processor. The host system (e.g., system 100 of FIG. 1) collects telemetry data while the application executes on the parallel processor with the first task scheduling policy (block 710). Depending on the implementation, the telemetry data can include profiling data of previous task executions, task durations, power consumption data, and other data. Generally speaking, the telemetry data includes data, samples, parameters, execution time statistics, and so on that can be used to make more informed scheduling decisions.

Next, the telemetry data is uploaded to a server (e.g., cloud server) (block 715). In one implementation, the telemetry data is uploaded to the server on a given schedule (e.g., fixed schedule, programmable schedule). In another implementation, the telemetry data is uploaded to the server in response to the detection of a given condition. For example, the given condition can be a decline in performance of the system while the user plays the game, such as a reduction in frame rate, an increase in latency, or otherwise.

Then, the telemetry data is analyzed by the server (block 720). Depending on the implementation, the server can use trained neural networks, inference engines, other types of machine learning models, or other techniques or mechanisms to analyze the telemetry data. Based on the analysis, the server creates a second task scheduling policy that is predicted to result in better behavior for the application (e.g., result in higher performance and/or a better user experience) than the first task scheduling policy (block 725).

Next, a specification of the second task scheduling policy is sent to the host system (block 730). The second task scheduling policy could be new rules, a new set of parameters, a new set of neural network weights, modifications to the order of shader dispatch and execution, or other parameters, depending on the implementation. Then, the host system swaps out the first task scheduling policy for the second task scheduling policy at the next available opportunity (block 735). The next available opportunity can be a subsequent point in time amenable for a switch in task scheduling policy. For example, in one implementation, the host system switches to the second task scheduling policy at the next frame boundary. In this implementation, after the rendering tasks are issued for a first frame according to the first task scheduling policy, the switch to the second task scheduling policy will occur at the boundary between the first frame and a second frame. Then the rendering tasks for the second frame will be issued according to the second task scheduling policy. It is assumed for the purposes of this example that the first frame and the second frame are back-to-back frames with no intervening frames between them.

Next, the host system executes the application on the parallel processor using the second task scheduling policy (block 740). After block 740, method 700 ends. It is noted that method 700 can be repeated at certain intervals or method 700 can be initiated by the user. As a result of executing method 700 and switching to the second task scheduling policy, the application will be executed with better performance, frame time can be reduced, the resolution can be increased, visual quality can be improved, and/or other advantages obtained.

Turning now to FIG. 8, one implementation of a method 800 for a cloud server generating shader scheduling policies optimized for user-video game combinations is shown. A cloud server stores telemetry data on a per user and video game basis (block 805). In other words, the combination of a user identifier (ID) and video game ID is used as a lookup to a table storing telemetry or references to memory locations of stored telemetry. The cloud server analyzes the telemetry data for each user and video game combination and generates a shader scheduling policy specific to the user and video game combination (block 810). When the cloud server receives a request from a game console or other computing system for a shader scheduling policy (conditional block 815, "yes" leg), the cloud server retrieves a corresponding shader scheduling policy and conveys the retrieved shader scheduling policy to the game console or computing system (block 820). Alternatively, if the cloud server has not already generated a corresponding shader scheduling policy for the requesting console or system, then the cloud server can generate a new policy in response to receiving the request.

If the cloud server receives new telemetry data for a given user and video game combination (conditional block 825, "yes" leg), then the cloud server stores the new telemetry data and creates a reference to the new telemetry data in the table (block 830). Next, the cloud server analyzes the new telemetry data and generates a new shader scheduling policy for the given user and video game combination (block 835). The cloud server stores the new shader scheduling policy and inserts a reference to the new shader scheduling policy in the corresponding entry of the table (block 840). Next, the cloud server optionally sends the new shader scheduling policy to the given user's game console or computing system (block 845). Alternatively, the cloud server can wait for the given user's game console or computing system to send a request for the new shader scheduling policy before sending the new shader scheduling policy. After block 845, method 800 returns to conditional block 815.

Referring now to FIG. 9, one implementation of a method 900 for generating scheduling policies to optimize load balancing is shown. A client captures telemetry data, including load balancing data for a plurality of processing engines, while executing an application with a first task scheduling policy (block 905). It is noted that the plurality of processing engines can include a graphics engine, a compute engine, a copy engine, a machine learning engine, an inference engine, a geometry engine, a shader engine, a compute engine, a direct memory access (DMA) engine, a scalar engine, a vector engine, and so on. The number and type of processing engines can vary according to the implementation. In one implementation, the load balancing data includes one or more of execution status, the percentage of processing resources being utilized, performance data, latency data, and/or other parameters.

Next, the client uploads the telemetry data to a server (e.g., cloud server) (block 910). Then, the server analyzes the load balancing data so as to determine a second task scheduling policy that will result in a more equitable load balancing scheme than the first task scheduling policy (block 915). The server can also analyze other telemetry data to make other improvements to the task scheduling policy. Next, the server forwards a definition of the second task scheduling policy to the client (block 920). In response to receiving the definition of the second task scheduling policy, the client executes the application with the second task scheduling policy (block 925). After block 925, method 900 ends. As a result of using the second task scheduling policy, the client is able to execute the application in a more evenly balanced manner across its plurality of processing elements. This can result in better performance, lower latency, and/or other advantages as compared to the first task scheduling policy.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming; language, such as C. Alternatively, a hardware design language (I-EDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. The implementations are applied for up-scaled, down-scaled, and non-scaled images. Numerous variations and modifications will become apparent to those skilled in the art once the above disclosure is fully appreciated. It is intended that the following claims be interpreted to embrace all such variations and modifications.

What is claimed is:

1. An apparatus comprising:
   a scheduler comprising circuitry configured to:
      schedule, on a plurality of compute units, a plurality of shader tasks for a first video frame according to a first task scheduling policy;
      convey telemetry data corresponding to execution of the plurality of shader tasks;
      receive a specification of a second task scheduling policy responsive to the telemetry data, wherein the second task scheduling policy is based at least in part on the telemetry data; and
      schedule, on the plurality of compute units, the plurality of shader tasks for a second video frame according to the second task scheduling policy.

2. The apparatus as recited in claim 1, wherein the apparatus is further configured to convey the telemetry data to a processing circuit for analysis, the telemetry data being usable to inform generation or selection of the second task scheduling policy.

3. The apparatus as recited in claim 1, wherein the scheduler is configured to receive the specification of the second task scheduling policy from a remote server.

4. The apparatus as recited in claim 1, wherein:
   the plurality of shader tasks correspond to a first application being used by a first user; and
   the second task scheduling policy is based on at least one of the first user or the first application.

5. The apparatus as recited in claim 4, wherein the scheduler is further configured to convey an identification of the first user and the first application with telemetry data associated with the first application.

6. The apparatus as recited in claim 1, wherein the telemetry data comprises one or more of profiling data, task duration data, power consumption data, compute unit utilization, or rendering latency, corresponding to execution of one or more shader tasks from the plurality of shader tasks.

7. The apparatus as recited in claim 4, wherein the scheduler is further configured to convey indications of one or more sections of the first application during which portions of the telemetry data were collected.

8. A method comprising:
 scheduling, on a plurality of compute units, a plurality of shader tasks for a first video frame according to a first task scheduling policy;
 conveying telemetry data corresponding to execution of the plurality of shader tasks;
 receiving a specification of a second task scheduling policy responsive to conveying the telemetry data, wherein the second task scheduling policy is based at least in part on the telemetry data; and
 scheduling, on the plurality of compute units, the plurality of shader tasks for a second video frame according to the second task scheduling policy.

9. The method as recited in claim 8, further comprising conveying the telemetry data to a processing circuit for analysis, the telemetry data being usable to inform generation or selection of the second task scheduling policy.

10. The method as recited in claim 8, further comprising:
 receiving the specification of the second task scheduling policy from a remote server.

11. The method as recited in claim 8, wherein the plurality of shader tasks correspond to a first application being used by a first user; and
 the second task scheduling policy is based on at least one of the first user or the first application.

12. The method as recited in claim 11, further comprising conveying a first identifier (ID) of the first user and a second ID of the first application along with telemetry data associated with the first application.

13. The method as recited in claim 12, wherein the telemetry data is collected over a plurality of frames of the first application.

14. The method as recited in claim 8, wherein the telemetry data comprises one or more of profiling data, task duration data, power consumption data, compute unit utilization, or rendering latency, corresponding to execution of one or more shader tasks from the plurality of shader tasks.

15. A processor comprising:
 circuitry configured to:
 receive, from a computing device, telemetry data corresponding to a first application executing at the computing device, wherein the telemetry data comprises one or more of profiling data, task duration data, power consumption data, compute unit utilization, or rendering latency corresponding to execution of one or more shader tasks;
 generate, at least in part based on the telemetry data, a task scheduling policy for execution of a plurality of shader tasks associated with the first application; and
 convey the task scheduling policy to the computing device.

16. The processor as recited in claim 15, wherein the circuitry is configured to:
 receive a first identifier (ID) of a first user using the computing device;
 receive a second ID of the first application; and
 generate the task scheduling policy based in part on the first ID and the second ID.

17. The processor as recited in claim 16, wherein the task scheduling policy is based on at least one of the first user or the first application.

18. The processor as recited in claim 15, wherein the circuitry is further configured to:
 generate the task scheduling policy based on an analysis of a first portion of the telemetry data associated with a first section of the first application;
 store a specification of the task scheduling policy in a memory.

19. The processor as recited in claim 15, wherein the circuitry is configured to:
 retrieve, based at least in part based on the telemetry data, an existing task schedule policy for execution of one or more shader tasks of the plurality of shader tasks;
 convey the existing task scheduling policy to the computing device.

* * * * *